United States Patent
Ichikawa (10) Patent No.: US 11,243,721 B2
(45) Date of Patent: Feb. 8, 2022

(54) NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

(71) Applicant: Brother Kogyo Kabushiki Kaisha, Nagoya (JP)

(72) Inventor: Yushi Ichikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/168,297

(22) Filed: Feb. 5, 2021

(65) Prior Publication Data
US 2021/0255813 A1    Aug. 19, 2021

(30) Foreign Application Priority Data
Feb. 14, 2020    (JP) .............................. JP2020-022980

(51) Int. Cl.
*G06F 3/12*    (2006.01)

(52) U.S. Cl.
CPC .......... *G06F 3/1205* (2013.01); *G06F 3/1256* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,891,637 B1* | 5/2005 | Asami | .................... | G06F 40/114 358/1.18 |
| 7,379,198 B1* | 5/2008 | Ishida | .................. | G06K 15/005 358/1.13 |
| 2004/0263892 A1* | 12/2004 | Uchida | ................. | G06F 3/1245 358/1.13 |
| 2005/0206936 A1* | 9/2005 | Byde | .................... | H04N 1/3873 358/1.12 |
| 2007/0253010 A1* | 11/2007 | Selvaraj | ................ | G06F 3/1297 358/1.13 |

FOREIGN PATENT DOCUMENTS

JP    2009-295070 A    12/2009

* cited by examiner

*Primary Examiner* — Helen Zong
(74) *Attorney, Agent, or Firm* — Burr & Brown, PLLC (57) ABSTRACT

A non-transitory storage medium stores a plurality of instructions readable by a computer of an information processing apparatus. When executed by the computer, the plurality of instructions cause the information processing apparatus to obtain a quality parameter indicating print quality that includes at least a first quality and a second quality, determine, when the obtained quality parameter is the first quality, a first size range, determine, when the obtained quality parameter is the second quality, a second size range, accept, when the obtained quality parameter is the first quality, designation of the medium size parameter indicating a size within the first size range, and accept, when the obtained quality parameter is the second quality, designation of the medium size parameter indicating a size within the second size range and not within the first range in addition to the size within the first size range.

13 Claims, 9 Drawing Sheets

NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

CROSS REFERENCE TO RELATED APPLICATION

The present application claims priority from Japanese Patent Application No. 2020-022980, which was filed on Feb. 14, 2020, the disclosure of which is herein incorporated by reference in its entirety.

BACKGROUND

A technical field disclosed in the specification relates to a non-transitory storage medium storing a plurality of instructions configured to receive print settings and an information processing apparatus.

There is known a technique in which print settings used for printing in a printer are received and the printer is instructed to execute printing based on the print settings in an information processing apparatus such as a personal computer. For example, there is disclosed a technique in which a printer driver configured to control a rolled-paper printer allows the information processing apparatus to display a dialog box for receiving print settings including a sheet size.

SUMMARY

There is an upper limit of the data size of renderable image data in a printing system included in an operating system. Accordingly, there are disadvantages that a range of sizes of a print medium which can be set is provided or that a part of an image is not printed even when the size can be set, which are inconvenient when printing is executed to a print medium with a large size. A configuration that solves the above disadvantages is not disclosed even in the conventional printer driver configured to control the rolled-paper printer.

An aspect of the disclosure relates to a non-transitory storage medium storing a plurality of instructions configured to receive print settings and a technique capable of improving a degree of freedom in size setting of a print medium.

In one aspect of the disclosure, a non-transitory storage medium stores a plurality of instructions readable by a computer of an information processing apparatus. When executed by the computer, the plurality of instructions cause the information processing apparatus to obtain a quality parameter indicating print quality that includes at least a first quality and a second quality lower than the first quality, determine, when the obtained quality parameter is the first quality, a first size range predetermined so as to correspond to the first quality as a size range indicating a receivable medium size parameter, and determine, when the obtained quality parameter is the second quality, a second size range predetermined so as to correspond to the second quality as a size range indicating a receivable medium size parameter, the second size range exceeding the first size range, the medium size parameter being a parameter indicating a size of a print medium, accept, when the obtained quality parameter is the first quality, designation of the medium size parameter indicating a size within the first size range, and accept, when the obtained quality parameter is the second quality, designation of the medium size parameter indicating a size within the second size range and not within the first range in addition to the size within the first size range, the obtained quality parameter and the accepted medium size parameter being included in print settings used for generating print data.

In another aspect of the disclosure, an information processing apparatus includes a controller. The controller is configured to obtain a quality parameter indicating print quality that includes at least a first quality and a second quality lower than the first quality. The controller is configured to determine, when the obtained quality parameter is the first quality, a first size range predetermined so as to correspond to the first quality as a size range indicating a receivable medium size parameter, and determine, when the obtained quality parameter is the second quality, a second size range predetermined so as to correspond to the second quality as a size range indicating a receivable medium size parameter, the second size range exceeding the first size range, the medium size parameter being a parameter indicating a size of a print medium. The controller is configured to accept, when the obtained quality parameter is the first quality, designation of the medium size parameter indicating a size within the first size range, and accept, when the obtained quality parameter is the second quality, designation of the medium size parameter indicating a size within the second size range and not within the first range in addition to the size within the first size range, the obtained quality parameter and the accepted medium size parameter being included in print settings used for generating print data.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment embodying a non-transitory storage medium storing a plurality of instructions will be explained in detail with reference to the attached drawings. The embodiment discloses the non-transitory storage medium storing a plurality of instructions executed in a personal computer (hereinafter referred to as "PC") which can be connected to a printer as a device having a printing function.

Figure 1:
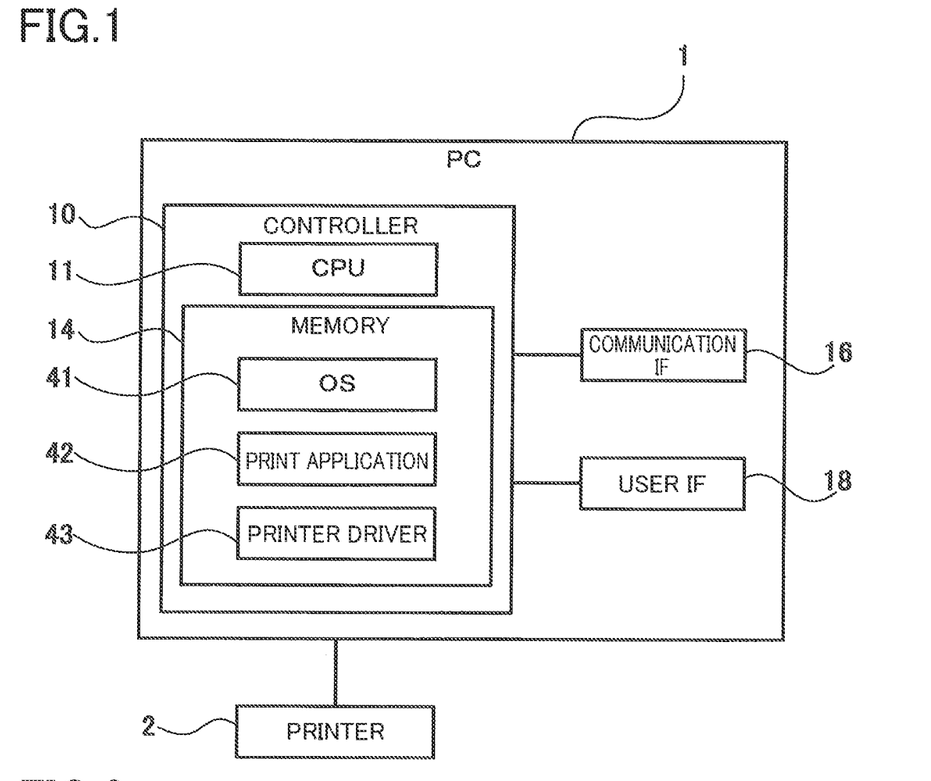
FIG. 1 is a schematic configuration diagram of a PC according to an embodiment.

A PC 1 according to the embodiment is connected to a printer 2 so as to communicate with each other, for example, as illustrated in FIG. 1. The PC 1 is an apparatus capable of executing various application programs (hereinafter referred to as "applications") for allowing the printer 2 to execute various functions. The PC 1 is an example of an information processing apparatus. For example, a smartphone or a tablet computer may be used instead of the PC 1.

The printer 2 is a device including at least a printing function of executing printing of an image on a printing medium and a communication function of executing communication with the PC 1. The printing medium is not limited to paper but may be cloth, a film and the like. Hereinafter, the size of the printing medium is referred to merely as a "sheet size". In the sheet size, the size in a conveying direction of the printing medium in the printer 2 is referred to as a "sheet height", and the size in a direction orthogonal to the conveying direction of the printing medium in the printer 2 is referred to as a "sheet width".

The printer 2 according to the embodiment includes a permanent sheet supply tray for placing cut sheet with standard sheet sizes (such as international standard A size and U.S. standard letter) so as to be fed, and detachable sheet supply trays are mountable. Then, as the detachable sheet supply trays, a rolled paper tray for placing rolled paper so as to be fed and a banner paper tray for placing cut banner paper so as to be fed are mountable on the printer 2 according to the embodiment. The printer 2 is a device capable of executing printing on the rolled paper or the banner paper by mounting the rolled paper tray or the banner paper tray.

The rolled paper and the banner paper have sizes difficult to be placed on the permanent sheet supply tray so as to be fed for the reason such that the sheet height is extremely longer than the sheet width (hereinafter, for convenience, also described as "a ratio of the sheet height with respect to the sheet width is higher than the standard size"). The printer 2 may further have a multipurpose tray capable of placing the banner paper so as to be fed.

The rolled-paper is paper wound in a roll state. The printer 2 can execute printing while unwinding and supplying the rolled paper by mounting the rolled paper tray. The printer 2 according to the embodiment may mount a cutter for cutting so as to discharge a printed part as an option of the rolled-paper tray. The banner paper is banner paper that has been already cut, and the banner paper is sheet in which the ratio of the sheet height with respect to the sheet width is higher than the standard size.

The PC 1 includes a controller 10 having a CPU 11 and a memory 14 as illustrated in FIG. 1. The PC 1 also includes a communication interface (hereinafter referred to as "communication IF") 16 and a user interface (hereinafter referred to as "user IF") 18, and the communication IF 16 and the user IF 18 are electrically connected to the controller 10. The controller 10 in FIG. 1 is a general term used when hardware and software used for controlling the PC 1 are collectively called, and the controller 10 does not always represent single hardware existing in the PC 1.

The CPU 11 executes various processing in accordance with programs read out from the memory 14 or based on operations by a user. The CPU 11 is an example of a computer. The memory 14 is, for example, an HDD or a flash memory, and the memory 14 is used as an area storing various programs, data such as image data and document data, and various settings. A buffer provided in the CPU 11 is also an example of the memory.

An example of the memory may be a storage medium readable by a computer. The storage medium readable by the computer is a non-transitory medium. The non-transitory medium includes a recording medium such as CD-ROM and a DVD-ROM in addition to the examples described above. The non-transitory medium is also a tangible medium. On the other hand, an electrical signal carrying programs downloaded from a server or the like on Internet is a signal medium readable by the computer and is a kind of medium readable by the computer; however, the signal medium is not included in the storage medium which is non-transitory and is readable by the computer.

The communication IF 16 includes hardware for communicating with external devices such as the scanner 2. A communication system of the communication IF 16 may be either of wireless or wired communication, and any system of standards such as Wi-Fi (registered trademark), Bluetooth (registered trademark), USB, and LAN may be used.

The user IF 18 includes hardware configured to display information on a screen and hardware configured to receive input operations by the user. The user IF 18 may be a touch panel having a display function and an input receiving function, or a combination of a display having the display function and a keyboard or a mouse having the input receiving function.

In the memory 14 of the PC 1 according to the embodiment, an operating system (hereinafter referred to as "OS") 41, a print application 42 and a printer driver 43 are incorporated. The OS 41 is, for example, Windows (registered trademark), mac OS (registered trademark), iOS (registered trademark), Android (registered trademark), or Linux (registered trademark). The print application 42 is an example of an application program. The printer driver 43 is an example of a plurality of instructions.

The print application 42 is a program configured to receive various instructions related to printing. The print application 42 receives, for example, a designation of a device which executes printing, a designation of an image to be printed, an instruction for editing print settings and an instruction for executing printing. The print application 42 may further receive designations of a type and the size of sheet used for printing, a designation of the number of copies, selection of print quality, and the like. When the printer 2 is designated, the print application 42 obtains information related to abilities of the printer 2 by inquiring of the printer driver 43. Then, the print application 42 determines a receivable range of choices based on the obtained information of abilities.

The printer driver 43 is a program conforming to a model of the printer 2, and the printer driver 43 controls the operation of the printer 2 by communicating with the printer 2. The printer driver 43 is started up, for example, when the instruction for executing printing or the instruction for editing print settings is received in a state in which the printer is designated by the print application 42, when an instruction for setting properties of the printer 2 is received, and when the inquiry about abilities of the printer 2 is received.

The printer driver 43 receives the instruction for editing the detailed print settings related to printing in the printer 2, for example, the printer driver 43 receives selection of the type and size of sheet as the printing medium, registration of a user definition size as the sheet size, a designation of print quality, and selection of the sheet supply tray or a sheet discharge tray. When the printer driver 43 receives a printing job from the OS 41, the printer driver 43 generates print data based on image data designated in the printing job. The print data is data included in a printing command passed to the printer 2. Each of choices of the sheet sizes correspond to an example of a medium size parameter.

The printer driver 43 has two or more qualities as selectable print qualities, and receives selection by the user. The printer driver 43 according to the embodiment has three choices which are, for example, "best quality", "high quality", and "high speed" in descending order of the print quality. "High speed" is a choice in which a printing speed is increased by executing printing with a low print quality. The number of choices of the print quality is at least two or more and may be four or more. The print quality is an example of a printing quality, and each of choices corresponds to a quality parameter.

The high print quality means that print resolution is higher as compared with resolution of low print quality or that the pixel number is larger when compared in images with the same size. For example, "best quality" is an example of a first resolution and a first quality. "High quality" and "high speed" correspond to an example of a second resolution and a second quality. There exists a printer capable of selecting choices such as "super fine", "fine" and "normal" as image qualities; however, the print resolution is changed also according to the selection. The choices such as "super fine", "fine" and "normal" correspond to an example of choices of print quality.

The data size of print data generated by the printer driver 43 differs according to the sheet size and print quality even when the print data is based on the same image data. The larger the data size is, the larger the sheet size is, or the higher the print quality is. The printer driver 43 according to the embodiment uses a part of functions of the OS 41, which is, for example, a rendering function at the time of generating print data. Accordingly, there is an upper limit of the data size of print data which can be appropriately generated due to functional restriction of the OS 41.

Figure 2:
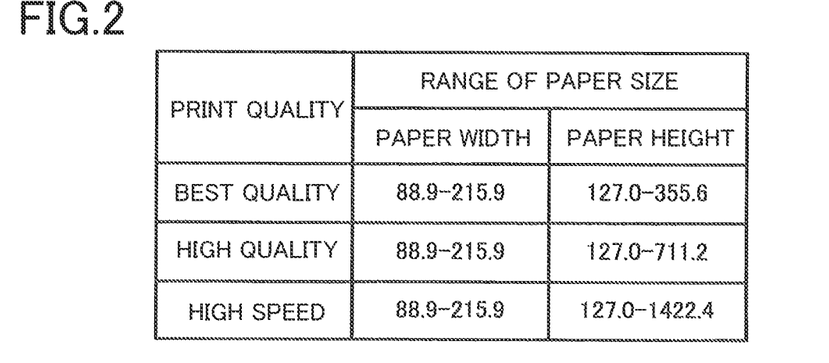
FIG. 2 is an explanatory view illustrating an example of relationship between print quality and sheet size.

The printer driver 43 according to the embodiment predetermines and stores a range of sheet sizes applicable to respective print qualities based on the data sizes of print data which can be generated. FIG. 2 illustrates an example of a relationship between the print quality and the range of the sheet size. As illustrated in FIG. 2, for example, the maximum sheet height which can be set when the print quality is "high quality" is twice as high as the maximum sheet height which can be set when the print quality is "best quality". For example, the range of sheet sizes applicable to "best quality" is an example of a first size range, and a range of sheet sizes applicable to the "high quality" and the "high speed" is an example of a second size range.

The applicable range of sheet sizes means a range in which print data indicating an image with a resolution for printing the image on the sheet with the print quality can be appropriately generated by using the function of the OS 41. There are upper limits of the sheet width and the sheet height in the applicable range of sheet sizes, respectively. The higher the print quality is, the smaller the applicable maximum sheet size is. That is, the range of sheet sizes selectable when the print quality is low includes sizes that are not included and not selectable when the print quality is high. Note that the printer driver 43 predetermines and stores the selectable minimum sheet size, however, the selectable minimum sheet size is determined according to the configuration or functions of the printer 2, which is not relevant to the print quality.

The printer driver 43 according to the embodiment can use sheet names of standard sizes provided in the printer driver 43 in advance and information of sheet with the user definition size defined and registered by the user as information of sheet sizes to be selected. The sheet names of standard sizes are, for example, A4, 10×15 cm, A5, A6, Letter, Legal, A3, and Ledger. The information of the sheet with the user definition size is a pair of information of a sheet name and information of a sheet size defined by the user. For example, when the rolled-paper tray or the banner paper tray is selected, the printer driver 43 according to the embodiment receives a selection of the sheet with the user definition size, not the standard size.

Next, processing by the printer driver 43 according to the embodiment will be explained. Note that the following processing and respective processing steps of a flowchart basically indicate processing of the CPU 11 configured to follow commands described in respective programs. That is, processing such as "determination", "extraction", "selection", "calculation", "determination", "specification", "obtainment", "reception", and "control" in the following explanation indicate processing of the CPU 11. The processing by the CPU 11 also includes hardware control using an API of the OS 41 in the PC 1. In the specification, the description of the OS 41 is omitted and operations of respective programs will be explained. That is, a description saying that "a program B controls hardware C" may indicate that "the program B controls hardware C by using the API of the OS 41" in the following explanation. Moreover, processing of the CPU 11 configured to follow commands described in the program is described in simplified wording in some cases. For example, the description will be made such as "the CPU 11 executes . . . " and "the program executes . . . ".

Note that "obtainment" will be used in a concept that the request is not essential. That is, processing of receiving data without being requested by the CPU 11 is also included in a concept that "the CPU 11 obtains data". "Data" in the specification is represented by a bit string readable by the computer. Then, data having substantially the same contents in a different format will be dealt with as the identical data. The same applies to "information" in the specification. Moreover, "to request" and "to instruct" are concepts that information indicating the request and information indicating the instruction are outputted to the other party. The information indicating the request and the information indicating instruction may be written merely as "request" and "instruction".

Furthermore, processing of determining whether information A indicates that it is a matter B by the CPU 11 may be conceptually described such as "whether it is the matter B or not is determined from the information A". Processing of determining whether information A indicates that it is a matter B or a matter C may be conceptually described such as "whether it is the matter B or the matter C is determined from the information A".

Hereinafter, a procedure of print setting processing by the printer driver 43 according to the embodiment will be explained with reference to a flowchart of FIG. 3. The print setting processing is executed by the CPU 11 of the PC 1 after the printer driver 43 is started up by the print application 42 or the like that receives an instruction for editing print settings or the like. When the printer driver 43 is started in advance, the application that receives the instruction for editing print settings instructs the printer driver 43 to start execution of the print setting processing.

The CPU 11 first obtains print settings that are presently selected (S101). The print settings include settings of the sheet size and the print quality. The print settings are various parameters used for instructing the printer to execute printing.

At the time of starting the printer driver 43, the CPU 11 reads out print settings stored in a storage area for the printer driver 43 in the memory 14 and stores the print settings in a prescribed data structure. The data structure is an area shared between an application such as the print application 42 and the printer driver 43, and the data structure may be edited by both the application 42 and the printer driver 43. The data structure is an area temporarily used only in the middle of execution of the application such as the print application 42, and the data structure is discarded when the application ends. At S101, the CPU 11 reads out print settings stored in the data structure. The CPU 11 executes editing by referring to the read print settings in the following processing.

On the other hand, the storage area for the printer driver 43 is an area provided when the printer driver 43 is installed in the PC 1, the storage area for the printer driver 43 is, for example, a registry or a configuration file. The storage area for the printer driver 43 is an area to be held regardless of the execution status of the printer driver 43 or the application such as the print application 42, and the storage area for the printer driver 43 is permanently used. When installing the printer driver 43, an installer of the printer driver 43, the OS 41, the printer driver 43 just after the installation and the like store various information in storage areas thereof. As information stored in the storage area for the printer driver 43, there are, for example, information of print settings, model information, and information edited after the installation.

The model information is information indicating a model of the printer to be instructed to execute printing by the printer driver 43. The printer driver 43 may be a program conforming to, for example, a plurality of models in the same product series, and model information of the printer to be used (the printer 2 in the embodiment) is stored at the time of installing the printer driver 43. The printer driver 43 can recognize the model of the printer to be controlled based on information stored in the storage area for the printer driver 43.

The CPU 11 determines the receivable range of sheet sizes based on the setting of print quality included in the print settings obtained at S101 and the model information of the printer (S102). The range of the sheet size includes the range of the sheet width and the range of the sheet height. The printer driver 43 stores respective ranges of the sheet width and the sheet height for each print quality in advance as the range of the sheet size in which print data can be generated, for example, as illustrated in FIG. 2. For example, when "best quality" is set as the print quality of the print setting obtained at S101, the range of the sheet width is "88.9-215.9 (mm)", and the range of the sheet height is "127.0-355.6 (mm)".

Then, the CPU 11 controls the user IF 18 to display a print setting screen (S103), and displays the print settings obtained at S101 on the print setting screen. An example of the print setting screen is illustrated in FIG. 4. On a print setting screen 51 illustrated in the example of FIG. 4, a selection field for the sheet size 511, a selection field for print quality 512, an OK button 514, and a cancel button 515 are displayed. The CPU 11 receives operations to respective selection fields and respective buttons displayed on the print setting screen 51.

When the CPU 11 receives an operation by the user, for example, to the selection field for the sheet size 511 on the print setting screen 51, the CPU 11 displays a list of selectable sheet sizes. The selectable sheet sizes include choices of the sheet names of standard sizes, registered user definition sizes, and registration of the user definition size. When the CPU 11 receives an operation by the user to the selection field for print quality 512, the CPU 11 displays a list of print qualities selectable with respect to the selected sheet size. As choices of print qualities, for example, choices of "best quality", "high quality", and "high speed are included.

The CPU 11 determines whether the user definition size has been designated as the sheet size or not, or whether an instruction for changing the print quality has been received or not by the user's operation (S104). When it is determined that neither the designation of the user definition size nor the instruction for changing the print quality has been received (S104: NO), the CPU 11 determines whether another change instruction has been received or not (S105). When it is determined that another change instruction has not been received (S105: NO), the CPU 11 determines whether an input to the OK button 514 has been received or not (S106). When it is determined that the input has not been received (S106: NO), the CPU 11 determines whether an input to the cancel button 515 has been received or not (S107). When it is determined that the input to the cancel button 515 has not been received (S107: NO), the CPU 11 returns to S104 and further receives an input.

When it is determined that the designation of the user definition size or the instruction for changing the print quality has been received (S104: YES), the CPU 11 executes size check processing (S108). The size check processing is the processing for checking whether the instruction for changing the sheet size or the print quality corresponds to a change within a range in which print data can be generated or not.

In the print setting processing, the CPU 11 determines YES at S104 when receiving the instruction for selecting the user definition size which has been registered as the sheet size or when receiving the instruction for registering the user definition size, and the CPU 11 determines NO at S104 when receiving the instruction for selecting the sheet name of the standard size. In the case where the sheet names of standard sizes are selected, print data can be generated regardless of print quality in the printer driver 43 according to the embodiment, therefore, it is not necessary to check the range of sheet sizes.

A procedure of the size check processing will be explained with reference to a flowchart of FIG. 5. The CPU 11 determines whether the size check processing has been started or not by receiving the instruction for registering the user definition size as the instruction for changing the sheet size (S201). When it is determined that the instruction for registering the user definition size has been received (S201: YES), the CPU 11 executes the user definition registration processing (S202). The instruction for registering the user definition size is an example of a medium size changing instruction.

The user definition registration processing is processing in which the designation of the sheet name or the sheet size is received and is registered as the user definition size. A procedure of the user definition registration processing will be explained with reference to a flowchart of FIG. 6.

Figure 6:
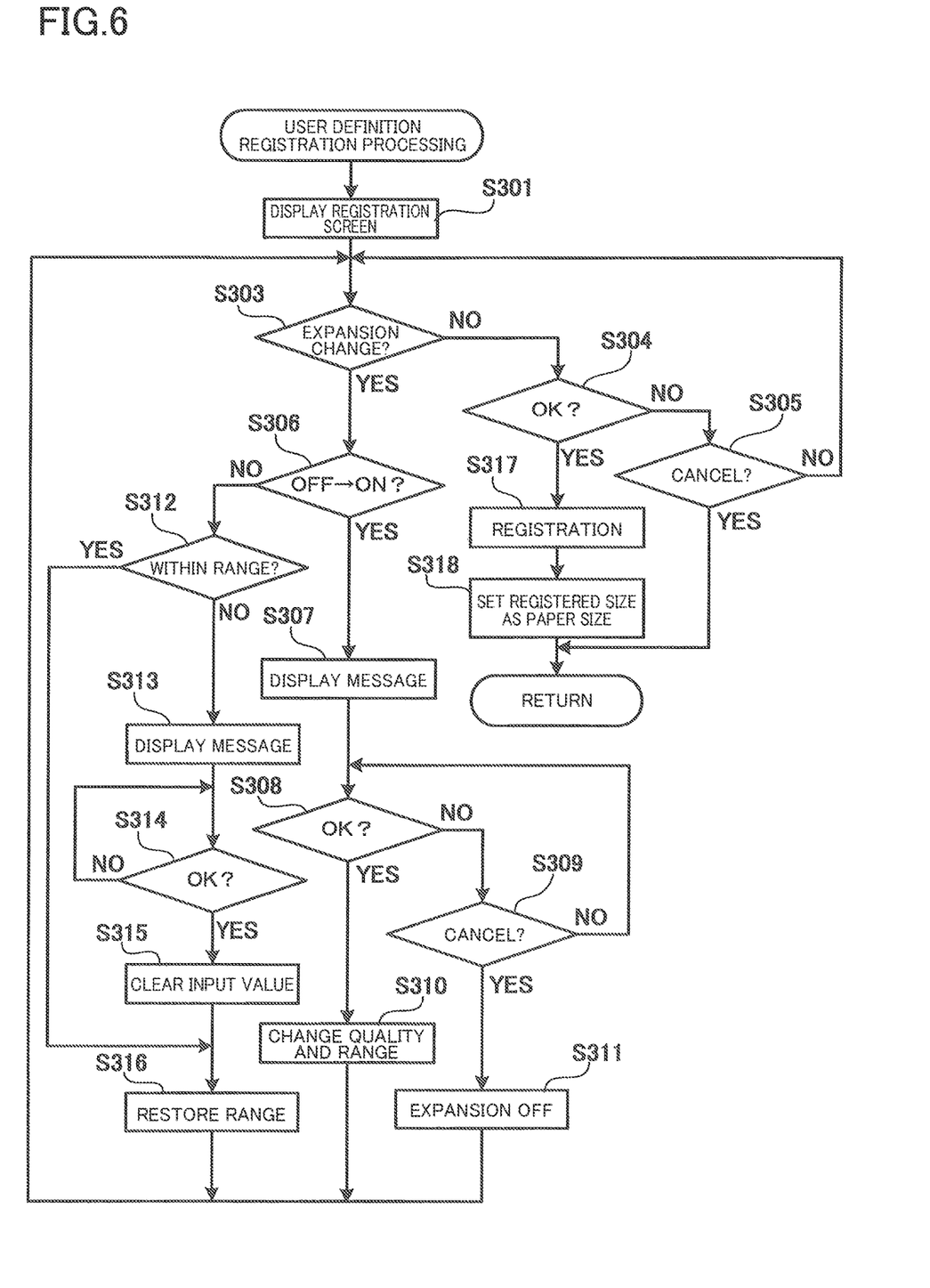
FIG. 6 is a flowchart illustrating a procedure of user definition registration processing.
Figure 7:
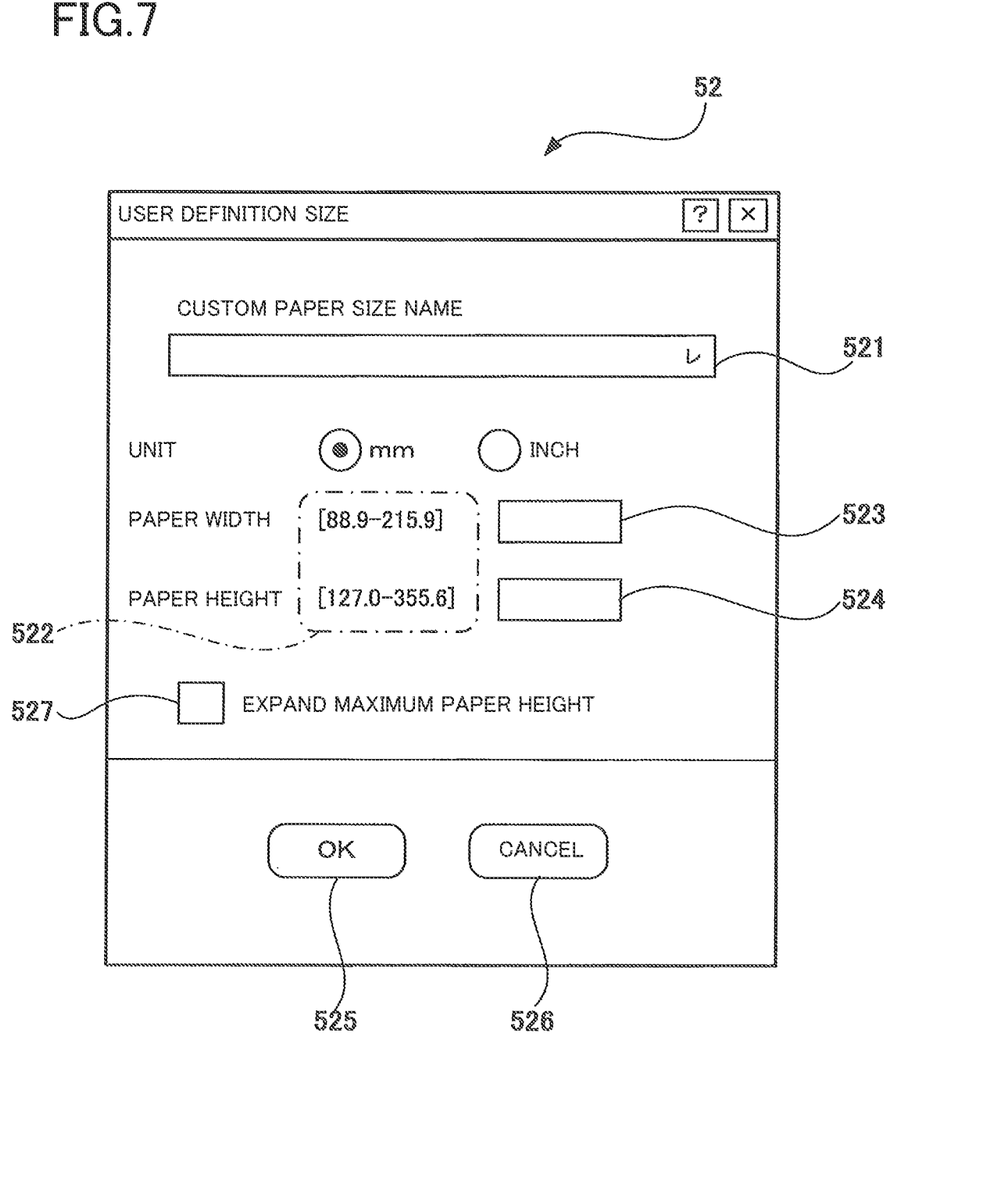
FIG. 7 is an explanatory diagram illustrating an example of a registration screen.

In the user definition registration processing, the CPU 11 controls the user IF 18 to display a registration screen of the user definition size (S301). An example of the registration screen is illustrated in FIG. 7. On a registration screen 52 illustrated in FIG. 7, an input field for the sheet name 521, a range of inputtable sheet sizes 522, an input field for the sheet width 523, an input field for the sheet height 524, an OK button 525, and a cancel button 526 are displayed. As the range of inputtable sheet sizes 522, the CPU 11 displays an applicable range of the sheet sizes so as to correspond to the print quality presently designated. In the input field for the sheet width 523 and the input field for the sheet height 524, only numerical values within the range displayed in the range 522 can be inputted. A check box 527 for receiving an instruction for expanding an allowable range of sheet heights is further displayed on the registration screen 52. The range of sheet widths is limited according to a structure of the printer 2 and does not receive the expansion instruction.

Then, the CPU 11 determines whether the input to the check box 527 has been received or not (S303). When it is determined that the input has not been received (S303: NO), the CPU 11 determines whether the input to the OK button 525 has been received or not (S304). The CPU 11 can receive the input to the OK button 525 when information is inputted to the input field for the sheet name 521, the input field for the sheet width 523, and the input field for the sheet height 524 respectively. When it is determined that the input to the OK button 525 has not been received (S304: NO), the CPU 11 determines whether the input to the cancel button 526 has been received or not (S305). When it is determined that the input has not been received (S305: NO), the CPU 11 returns to S303, and further receives an input.

When it is determined that the input to the check box 527 has been received (S303: YES), the CPU 11 determines whether it is the change from "without a check mark" to "with a check mark" or not (S306). The check box 527 is in a state of "without a check mark" in an initial state as illustrated in FIG. 7. On the registration screen 52, the CPU 11 alternately displays "with a check mark" and "without a check mark" every time the input to the check box 527 is received.

The range 522 displayed on the registration screen 52 is a range of sheet sizes conforming to the print quality which is presently set. The range of sheet sizes can be expanded by reducing the print quality. In a case where the print quality set at present is the selectable lowest print quality, the range of sheet sizes is not capable of being expanded. and the CPU 11 does not receive the instruction for expanding the range. In this case, the CPU 11 does not display the check box 527 on the registration screen 52 or displayed in a grayed-out state.

When it is determined that it is the change instruction from "without a check mark" to "with a check mark" (S306: YES), the CPU 11 allows the user IF 18 to display a notification message for notifying that print quality is reduced (S307). The change instruction from "without a check mark" to "with a check mark" is an instruction for expanding the range of sheet sizes, which is an example of the expansion instruction.

Figure 8:
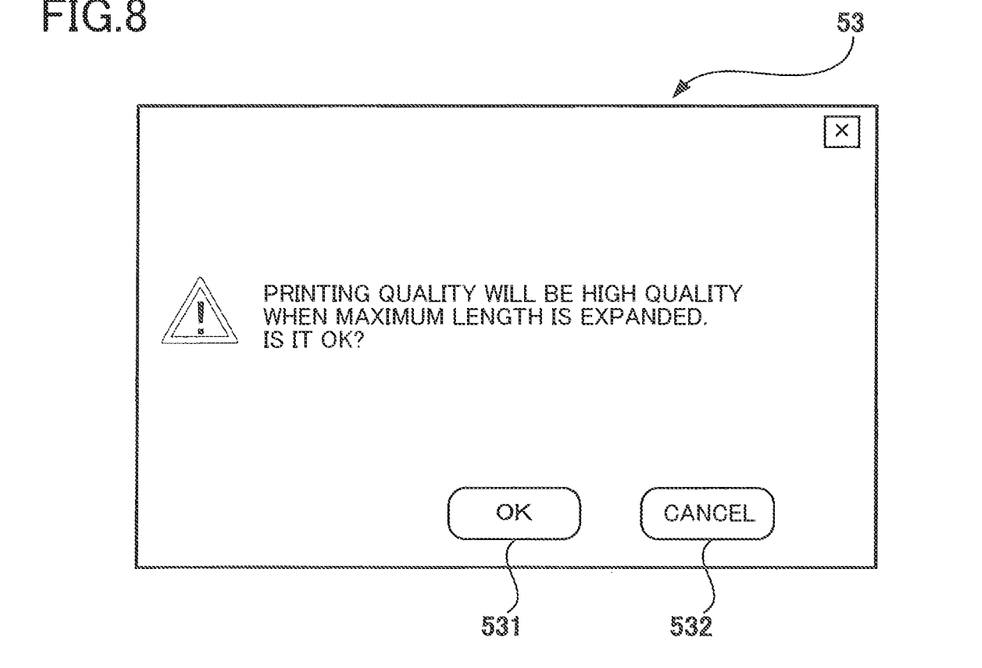
FIG. 8 is an explanatory diagram illustrating an example of a notification message.

An example of the notification message is illustrated in FIG. 8. A notification message 53 illustrated in FIG. 8 is an example displayed when the set print quality is "best quality", and the notification message 53 is a message notifying the user that it is necessary to reduce the print quality from "best quality" to "high quality" for expanding the sheet size. When there are a plurality of stages of print qualities lower than the set print quality, a print quality after change will be a print quality just below the set print quality. An OK button 531 and a cancel button 532 are displayed in the notification message 53, and the CPU 11 receives an operation to either button.

The CPU 11 determines whether an operation to the OK button 531 has been received or not (S308). When it is determined that the operation to the OK button 531 has not been received (S308: NO), the CPU 11 determines whether an operation to the cancel button 532 has been received or not (S309). When it is determined that the operation to the cancel button 532 has not been received (S309: NO), the CPU 11 waits until an operation to either button is received.

When it is determined that the operation to the OK button 531 has been received (S308: YES), the CPU 11 changes the set print quality and the range of the sheet sizes 522 on the registration screen 52 (S310). Specifically, the CPU 11 changes the print quality to be reduced by one stage, reads out the range of sheet sizes conforming to the changed print quality and displays the range on the registration screen 52. On the other hand, when it is determined that the operation to the cancel button 532 has been received (S309: YES), the CPU 11 determines that the expansion is not executed (S311), and the CPU 11 changes the check box 527 to "without a check mark".

When it is determined that the input to the check box 527 is not the change from "without a check mark" to "with a check mark" (S306: NO), namely, when it is determined that the change from "with a check mark" to "without a check mark" has been received, the CPU 11 determines whether the sheet size inputted in the input field for the sheet width 523 or the input field for the sheet height 524 is within the range of sheet sizes conforming to the previous print quality before changing at S310 or not (S312). The CPU 11 may store the range at the time of starting the user definition registration processing or may obtain anew at the time of determination at S312. The change instruction from "with a check mark" to "without a check mark" is an instruction for returning the range of sheet sizes to an original, and the change instruction is an example of a return instruction.

When it is determined that the sheet size is not within the range (S312: NO), the CPU 11 causes the user IF 18 to display a size warning message indicating that the sheet size is not appropriate (S313).

Figure 9:
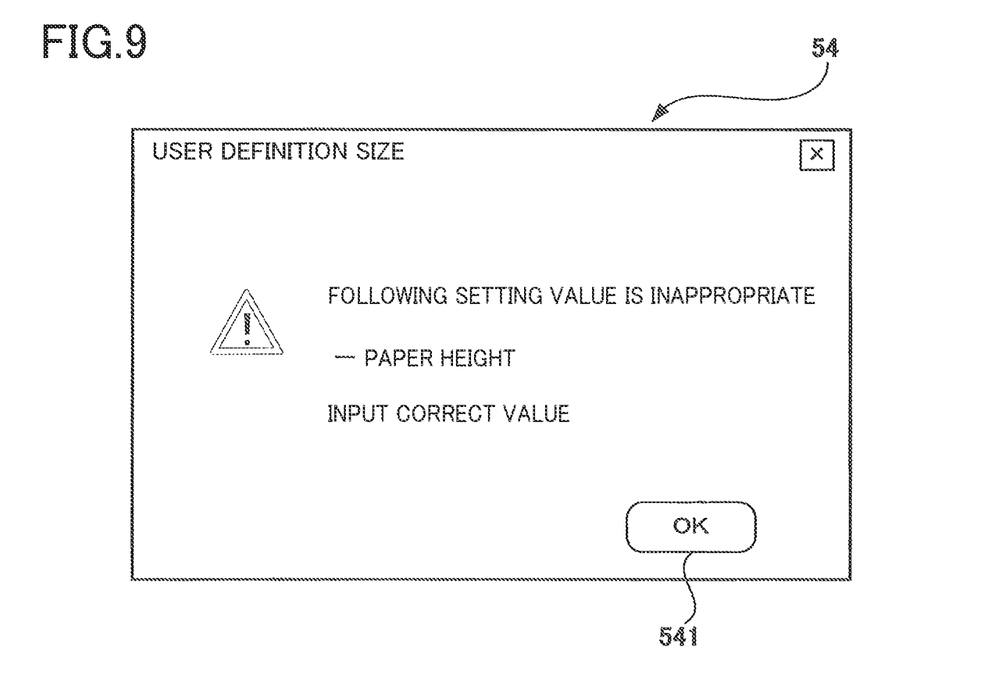
FIG. 9 is an explanatory diagram illustrating an example of a size warning message.

An example of the size waring message is illustrated in FIG. 9. A size warning message 54 illustrated in FIG. 9 is a message indicating that the sheet height inputted in the input field for the sheet height 524 is not within the range capable of conforming to the original print quality. An OK button 541 is displayed in the size warning message 54.

The CPU 11 determines whether an operation to the OK button 541 has been received or not (S314). When it is determined that the operation has not been received (S314: NO), the CPU 11 waits until the operation is received. When it is determined that the operation has been received (S314: YES), the CPU 11 clears a value of the sheet size inputted in the input field for the sheet height 524 (S315). The CPU 11 may clear a value of the input field for the sheet width 523.

After S315, or when it is determined that the inputted sheet size is within the allowable range (S312: YES), the CPU 11 returns the range of the receivable sheet sizes 522 to a range before expansion (S316). At S316, the CPU 11 also returns the print quality to the print quality before the change.

After any of S310, S311, and S316, the CPU 11 returns to S303 and receives an input to the registration screen 52.

When it is determined that the input to the OK button 525 has been received (S304: YES), the CPU 11 registers the received sheet size as the user definition size (S317).

When receiving the registration instruction, the CPU 11 stores information of the sheet name and the sheet size which are presently displayed into the storage area for the printer driver 43 as sheet information of the user definition size. The storage area for the printer driver 43 differs from the data structure that temporarily stores print settings to be edited, and the storage area for the printer driver 43 is a permanent area. The registered information of the user definition size can be referred to in the middle of presently executing applications such as the print application 42 or the printer driver 43 or in the middle of the execution of the applications next time or later, and the registered information is displayed, for example, as one of choices of sheet sizes on the print setting screen 51 illustrated in FIG. 4.

Furthermore, the CPU 11 sets the registered sheet size as the sheet size of the print setting at the time of editing (S318), and the CPU 11 ends the user definition registration processing. The sheet size in the print setting at the time of editing is a sheet size selected in the selection field for the sheet size 511 in the print setting screen 51. When the sheet size is determined to be set as the print setting, it is the sheet size in the print setting to be stored into the above-described data structure. On the other hand, when it is determined that the input to the cancel button 526 has been received (S305: YES), the CPU 11 does not register the sheet size, the CPU 11 ends the user definition registration processing and returns to the size check processing.

Figure 5:
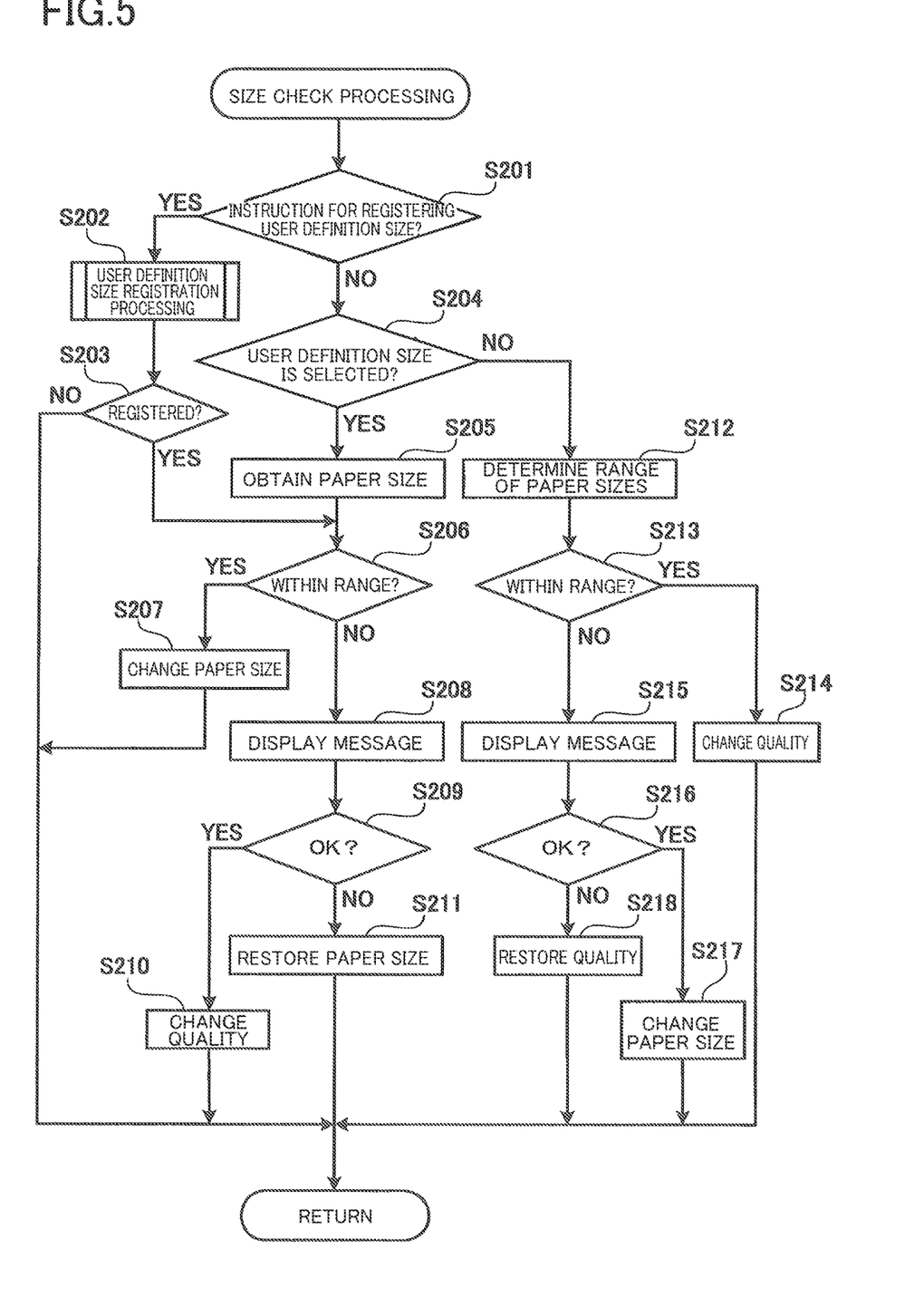
FIG. 5 is a flowchart illustrating a procedure of size check processing.

The explanation returns to the size checking processing of FIG. 5. In the size checking processing, it is determined whether the user definition size has been registered in the user definition registration processing after the user definition registration processing of S202 (S203). When it is determined that the user definition registration processing has been ended by receiving the instruction for cancel, not by receiving the instruction for registration (S203: NO), the CPU 11 ends the size check processing and returns to the print setting processing, and further receives various inputs to the print setting screen 51.

On the other hand, when it is determined that the instruction received in the print setting screen 51 is not the instruction for registering the user definition size (S201: NO), the CPU 11 determines whether the received instruction is an instruction for selecting the registered user definition size or not (S204). When it is determined that the instruction for selecting the registered user definition size has been received (S204: YES), the CPU 11 obtains the sheet size of the selected sheet (S205). Information of the sheet in the user definition sizes is stored in the storage area for the printer driver 43. The instruction for selecting the user definition size is an example of the medium size changing instruction.

After S205, or when it is determined that the user definition size has been registered in the user definition registration processing (S203: YES), the CPU 11 determines whether the designated sheet size is within a range of sheet sizes conforming to the print quality (S206). The range of sheet sizes conforming to the print quality is an example of a second threshold range. When it is determined that the sheet size is within the range (S206: YES), the CPU 11 changes the sheet size of the print setting to the registered or selected user definition size (S207).

When it is determined that the sheet size is not within the range (S206: NO), the CPU 11 causes the user IF 18 to display a message indicating that the sheet size is not within the range (S208). The message to be displayed at S208 is a quality change message indicating that the designated sheet size is not within the sheet size conforming to the set print quality and for inquiring whether the change of reducing the print quality is permitted or not.

Figure 10:
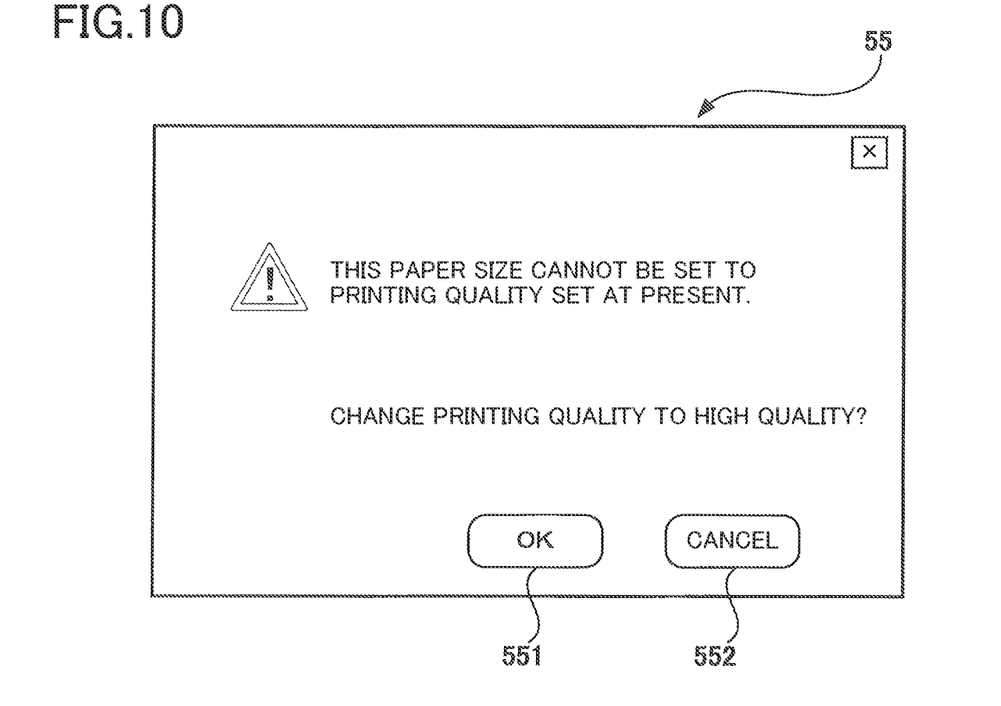
FIG. 10 is an explanatory diagram illustrating an example of a quality change message.

An example of the quality change message is illustrated in FIG. 10. A quality change message 55 illustrated in FIG. 10 is an example in which the print quality is set to "best quality" and the received sheet size exceeds the range capable of conforming to "best quality" but the received sheet size is within the range capable of conforming to "high quality". An OK button 551 and a cancel button 552 are displayed in the quality change message 55, and the CPU 11 receives an operation to either button.

Then, the CPU 11 determines whether the operation to the OK button 551 has been received or not (S209). When it is determined that the operation to the OK button 551 has been received (S209: YES), the CPU 11 changes the print quality (S210) to change the sheet size to the designated sheet size. Specifically, the CPU 11 reduces the print quality so that the designated sheet size is within the range conforming to the reduced print quality.

On the other hand, it is determined that the operation to the cancel button 552 has been received, not the OK button 551 (S209: NO), the CPU 11 cancels the change of the sheet size as the change instruction received last time, namely, the change to the sheet size registered by the instruction for registering the user definition size or to the selected registered user definition size, and the CPU 11 returns the sheet size to the original sheet size (S211).

On the other hand, when it is determined that the instruction received in the print setting screen 51 is not the instruction for registration or selection of the user definition size (S204: NO), that is, when it is determined that the instruction for changing the print quality has been received, the CPU 11 determines the range of the sheet size conforming to the received print quality (S212). In this case, the instruction for changing the print quality received at S104 of the print setting processing is an example of the quality change instruction, and S104 is an example of quality change receiving processing. S212 is an example of determination processing, and the range of sheet sizes determined at S212 is an example of a first threshold range.

Then, the CPU 11 determines whether the sheet size designated in the print setting screen 51 is within the range determined at S212 or not (S213). When it is determined that the sheet size is within the range (S213: YES), the CPU 11 changes the print quality to the designated print quality (S214).

When it is determined that the sheet size is not within the range (S213: NO), the CPU 11 causes the user IF 18 to display a message indicating that the sheet size is not within the range (S215). The message to be displayed at S215 is a size change message indicating that the set sheet size is not within a range capable of conforming to the print quality instructed to be changed and for inquiring whether the change of reducing the sheet height is permitted or not.

Figure 11:
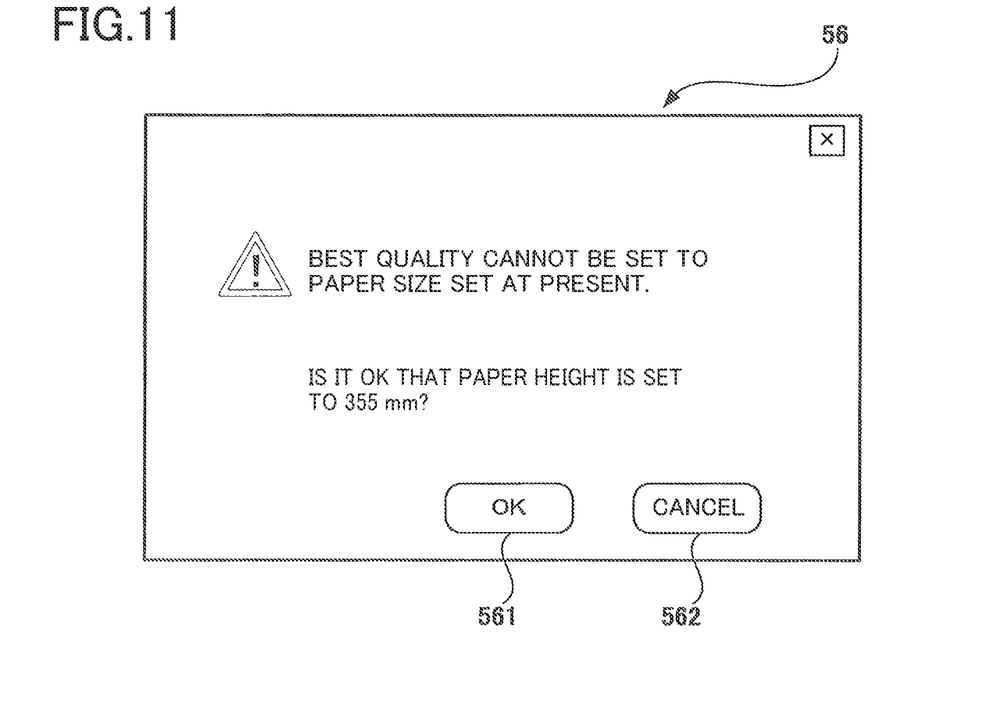
FIG. 11 is an explanatory diagram illustrating an example of a size change message.

An example of the size change message is illustrated in FIG. 11. A size change message 56 illustrated in FIG. 11 is an example in a case where the sheet size is set to the user definition size with a high sheet height and in a case where the sheet size is not within a range capable of conforming to "best quality" as the print quality which has received change instruction. In the size change message 56, the maximum sheet height conforming to "best quality" is displayed. An OK button 561 and a cancel button 562 are further displayed, and the CPU 11 receives an operation to either button.

Then, the CPU 11 determines whether an operation to the OK button 561 has been received or not (S216). When it is determined that the operation to the OK button 561 has been received (S216: YES), the CPU 11 changes the sheet height (S217) to change the print quality to the designated print quality. Specifically, the CPU 11 reduces the sheet height to the maximum sheet height capable of conforming to the designated print quality.

On the other hand, when it is determined that the operation to the cancel button 562 has been received, not the OK button 561 (S216: NO), the CPU 11 cancels the change of the print quality as the change instruction received last time and returns the print quality to the original print quality (S218).

After any of S207, S210, S211, S214, S217, and S218, the CPU 11 ends the size check processing and returns to the print setting processing, then, various inputs to the print setting screen 51 are further received. In the case where the selectable range of print qualities is changed according to the change of the sheet size, the CPU 11 changes choices of print qualities selectable in the selection field for print quality 512 in the print setting screen 51.

Figure 3:
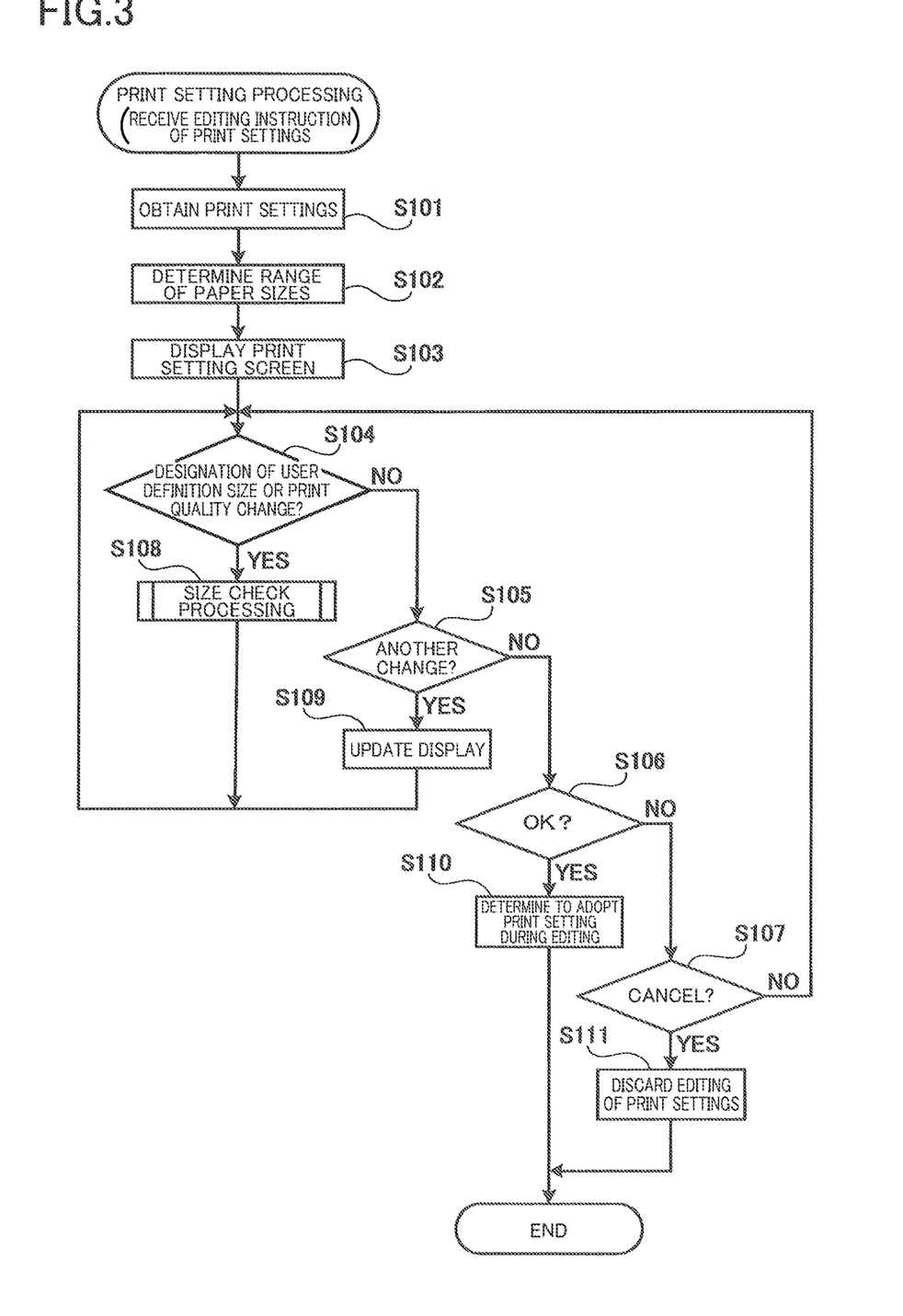
FIG. 3 is a flowchart illustrating a procedure of print setting processing.
Figure 4:
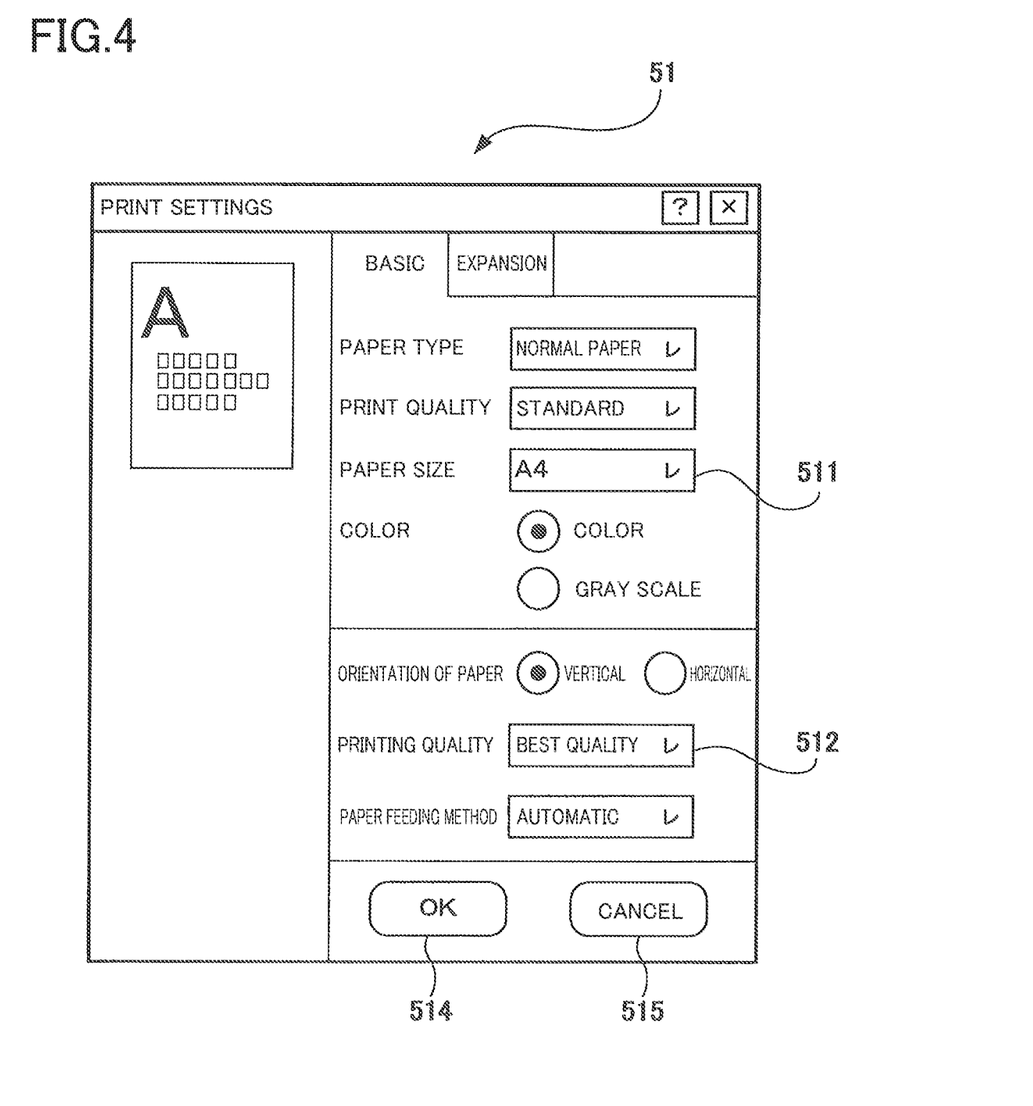
FIG. 4 is an explanatory view illustrating an example of a print setting screen.

Explanation returns to the print setting processing of FIG. 3. After the size check processing of S108, the CPU 11 returns to S104, and further receives an input to the print setting screen 51. When it is determined that an instruction for changing an item other than the sheet size and the print quality in the print setting screen 51 has been received (S105: YES), the CPU 11 updates the display of the print setting screen 51 (S109), returns to S104 and further receives an input.

When it is determined that the operation to the OK button 514 has been received in the print setting screen 51 (S106: YES), the CPU 11 determines to adopt the contents at the time of editing as print settings (S110), and the CPU 11 writes the determined print settings into the data structure and ends the print setting processing. Note that the CPU 11 may store the determined print settings into the storage area for the printer driver 43.

When it is determined that the operation to the cancel button 515 has been received in the print setting screen 51 (S107: YES), the CPU 11 discards all the editing received in the print setting screen 51 (S111) and ends the print setting processing. That is, the CPU 11 does not write the edited print settings into the data structure or the storage area for the printer driver 43 and discards information of the edited result.

The printer driver 43 executes the print setting processing not only by the instruction from applications such as the print application 42 but, for example, when an instruction for editing print settings is received from the OS 41, related tools provided by a manufacturer of the printer driver 43. In this case, the CPU 11 stores print settings determined at S110 into the storage area for the printer driver 43. That is, the print settings obtained after editing is permanent. The OS 41 or various related tools and applications may store the print settings obtained after editing into the storage area for the printer driver 43.

The case where the printer driver 43 is started up after receiving the instruction for editing print settings by the print application 42 or the like has been explained above. When the CPU 11 executes the print setting processing by the instruction from the print application 42 or the like, the data structure is held after the print setting processing is ended after S110 or S111 until the print application 42 or the like is ended. The print application 42 or the like receives various instructions receivable by the application after receiving notification of the end of the print setting processing by the printer driver 43.

The applications such as the print application 42 may receive an instruction for executing printing without receiving the instruction for editing print settings, namely, without executing the above print setting processing. Also in that case, the printer driver 43 reads out print settings stored in the storage area for the printer driver 43 and stores the settings into the data structure and the print application 42 or the like obtains print settings from the data structure in the same manner as the start of the print setting processing.

Moreover, the print application 42 according to the embodiment receives a selection of the print quality in the setting screen of the application. When the print application 42 receives an instruction for selecting the print quality in the state in which the printer 2 is selected as a device that executes printing, the print application 42 starts up the printer driver 43 and inquires of the printer driver 43 the range of print qualities conforming to the printer 2. When the printer driver 43 receives the inquiry from the print application 42, print quality response processing is executed.

Figure 12:
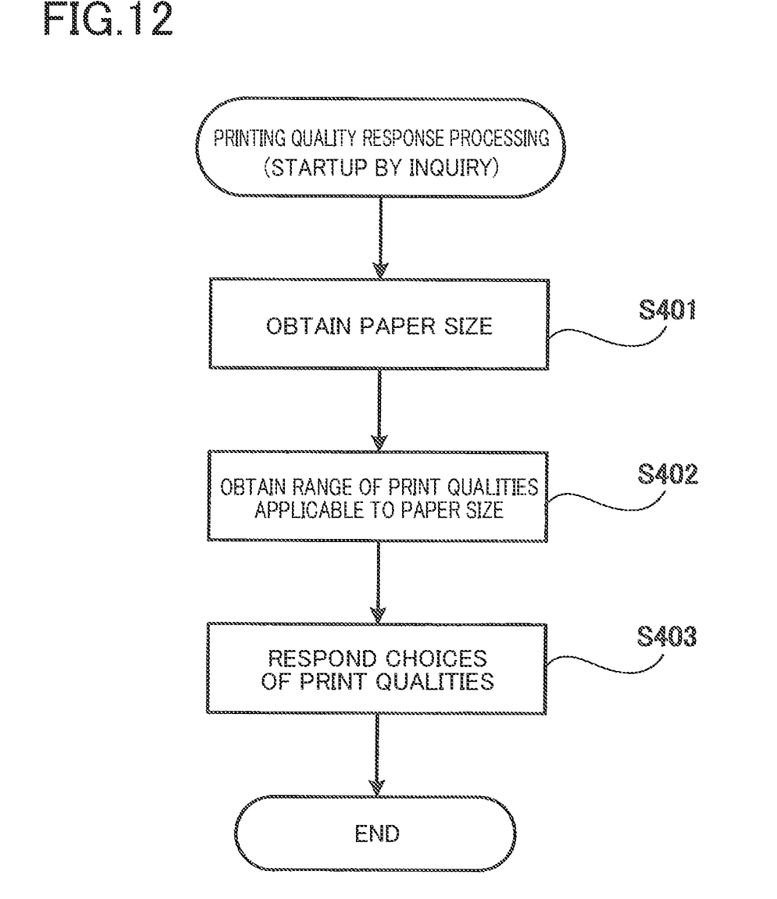
FIG. 12 is a flowchart illustrating a procedure of print quality response processing.

Next, a procedure of the print quality response processing by the printer driver 43 according to the embodiment will be explained with reference to a flowchart of FIG. 12. The print quality response processing is executed by the CPU 11 of the PC 1 after the printer driver 43 is started up by receiving the inquiry about the print quality from the print application 42. If the printer driver 43 is started up in advance, the print application 42 that receives the instruction for selecting the print quality instructs the printer driver 43 to execute the print quality response processing. The inquiry of the print quality received from the print application 42 is an example of an ability request.

In the print quality response processing, the CPU 11 obtains the set sheet size first (S401). Information of the sheet size may be obtained from the data structure shared between the print application 42 and the printer driver 43, may be passed from the print application 42 at the time of inquiry, and may be obtained by inquiring of the print application 42 by the printer driver 43. The information of the sheet size passed from the print application 42 at the time of inquiry is an example of information indicating a medium size parameter.

The CPU 11 obtains choices of print qualities in a range applicable to the obtained sheet size (S402). The CPU 11 extracts print qualities in which both the sheet width and the sheet height are within a range conforming to the print qualities from all choice of print qualities and obtains choices. The CPU 11 makes a response to the print application 42 about information indicating the obtained choices of print qualities (S403), and ends the print quality response processing.

The print application 42 receives a selection from the user by displaying selectable choices of print qualities based on the received information. When the printer driver 43 makes a response about applicable print qualities, it is possible to avoid receiving the selection of inappropriate print qualities by the print application 42. The exchange of information between the printer driver 43 and the print application 42 may be directly executed or executed through the OS 41.

As described above, the PC 1 including the printer driver 43 according to the embodiment determines the receivable range of sheet sizes conforming to the designated print quality and receives the designation of the sheet size in the determined range in the received print settings. For example, when the print quality with a low quality is designated, the receivable range of sheet sizes is expanded as compared with a case where the print quality with a high quality is designated, therefore, it is highly likely that a desired size can be accepted. As a result, a degree of freedom in the setting of sheet sizes is increased as compared with a case where the receivable range of sheet sizes is fixed.

Furthermore, the higher the print quality is, the smaller the receivable range of sheet sizes is in the embodiment. For example, the size of print data with low resolution is smaller than in a case of high resolution, therefore, a larger sheet size is receivable by selecting low resolution. Accordingly, the degree of freedom in the setting of sheet sizes is increased.

Furthermore, the receivable range of sheet sizes on the registration screen is changed according to the print quality designated in print settings in the embodiment, therefore, inappropriate settings can be avoided. The instruction for expanding the range of sheet sizes to be registered is received on the registration screen 52, and the print quality is reduced to be low according to the expansion instruction, which enables setting of sheet sizes in a wider range. Therefore, the receivable range of sheet sizes can be expanded based on a user's instruction.

Furthermore, when the instruction for expanding the range of sheet sizes is received, information indicating that the print quality is changed is notified in the embodiment, therefore, the user can recognize that the print quality is changed with the expansion of the receivable range of sheet sizes, and a doubt caused by a change not intended by the user can be avoided. When the instruction for expanding the range of sheet sizes is cancelled and the inputted sheet size is not within a range conforming to the original print quality, information for that is notified, therefore, an inappropriate setting can be avoided.

Also in the embodiment, in a case where the instruction for changing the print quality is received and the designated sheet size is not within the range of sizes allowable in the print quality after the change, information for that is notified, therefore, an inappropriate setting can be avoided. Moreover, the sheet size is changed so as to correspond to the print quality by giving priority to the received change in print quality when the instruction for changing the print quality is received, therefore, the user can change the print quality to a desired print quality and an inappropriate setting can be avoided.

Also, in the embodiment, in a case where the instruction for changing the sheet size is received and the sheet size after the change is not within the range of sizes allowable in the designated print quality, information for that is notified, therefore, an inappropriate setting can be avoided. Moreover, the print quality is changed so as to correspond to the sheet size by giving priority to the received change in sheet size when the instruction for changing the sheet size is received, therefore, the user can change the sheet size to a desired sheet size and an inappropriate setting can be avoided.

Also in the embodiment, choices of print qualities suitable for the selected sheet size are responded also when the ability request is received from the application such as the print application 42, therefore, it is possible to avoid selecting an inappropriate print quality by the application.

The embodiment is merely an example, and does not limit the disclosure at all. Therefore, various modifications and alterations may naturally occur in the present disclosure within a scope not departing from the gist thereof. For example, the printer 2 is not limited to a device having a single function of printing but may be a device, for example, having a document reading function or a FAX transmission/receiving function. The embodiment can be applied to the PC 1 connected to devices such as a multifunction device, a copy machine, and a FAX machine, instead of the printer 2. Moreover, two or more printers may be connected to the PC 1.

For example, the messages or the setting screens illustrated in respective drawings are examples, respectively, which may be displayed so that the equivalent contents can be notified. For example, the notification message 53 illustrated in FIG. 8 may be a message merely indicating that the quality is reduced instead of displaying the choice itself of the print quality to be changed, or may be indirect information caused by the quality change. As indirect information caused by the quality change, for example, there is information indicating that print speed is increased. In the case where there is a setting to be unavailable due to the change of print quality, information for that may be notified.

For example, the expansion instruction is not limited to the selection between ON and OFF, but may have stages. For example, a plurality of stages may be received until reaching the lowest quality. In the case where the input from "with a check mark" to "without a check mark" to the check box 527 is received, the print quality is returned with the range of sheet sizes in the above description, however, it is not always return the original print quality. In that case, the determination of the sheet size at S312 is not necessary and it is sufficient that the range of sheet sizes 522 is merely narrowed down. It is also preferable that the expansion instruction and the return instruction are not received, that is, that the check box 527 is not provided.

Also, for example, the determination of size check processing at S206 or S213 may be executed only when the change instruction for increasing the sheet size, or the change instruction for increasing the print quality is received. That is, it is also preferable that the determination at S206 or S213 is not executed when the change instruction for reducing the sheet size or the change instruction for reducing the print quality is received and that the process proceeds to S207 or S214.

Also, for example, in the case where the sheet size is out of the allowable range with respect to the print quality by the change instruction for the sheet size or the print quality, the message is displayed to inquire of the user in the above description, however, it is also preferable that priority is given to the received change instruction and the other is automatically changed. Also in that case, information indicating the change is preferably notified.

Also, for example, the allowable range of sizes in the designated print quality is displayed as the inputtable range of the sheet sizes 522 at S301 in the user definition registration processing in the embodiment, however, the present disclosure is not limited to this. For example, a default range may be displayed on an initial screen as the range of the inputtable sheet sizes 522. The default range is, for example, a range of sheet sizes applicable regardless of the print quality, namely, the range applicable to the best quality. In this case, the allowable range of sizes in the designated print quality is wider than the default range that is displayed if the designated print quality is not the best quality, therefore, the inputtable range of the sheet sizes 522 may be changed to the allowable range of sizes in the designated print quality when the check box 527 is changed from "without a check mark" to "with a check mark" (YES at S306). In this case, it is preferable that S307 to S311 are skipped without displaying the notification message and that the process proceeds to S303 by merely changing the display of the range of sheet sizes 522.

The conformity to the print quality is determined when the sheet size is the user definition size in the embodiment, however, the similar determination may be executed in the case of standard sizes. For example, sheet sizes not conforming to some of print qualities may be included in standard sizes. In this case, the CPU 11 determines YES at S104 of the print setting processing or S204 of the size check processing even when a sheet name of the standard size is selected.

In arbitrary flowcharts disclosed in each embodiment, a plurality of processing in a plurality of arbitrary steps may be arbitrarily changed in the execution order or may be executed in parallel in a range not causing discrepancy in the processing contents.

The processing disclosed in each embodiment may be executed by a single CPU, a plurality of CPUs, hardware such as ASIC or combinations of them. The processing disclosed in the embodiment may be realized in various states such as a recording medium recording programs or methods for executing the processing.

What is claimed is:

1. A non-transitory storage medium storing a plurality of instructions readable by a computer of an information processing apparatus,
    wherein, when executed by the computer, the plurality of instructions cause the information processing apparatus to:
    obtain a quality parameter indicating print quality that includes at least a first quality and a second quality lower than the first quality;
    determine, when the obtained quality parameter is the first quality, a first size range predetermined so as to correspond to the first quality as a size range indicating a receivable medium size parameter, and determine, when the obtained quality parameter is the second quality, a second size range predetermined so as to correspond to the second quality as a size range indicating a receivable medium size parameter, the second size range exceeding the first size range, the medium size parameter being a parameter indicating a size of a print medium; and
    accept, when the obtained quality parameter is the first quality, designation of the medium size parameter indicating a size within the first size range, and accept, when the obtained quality parameter is the second quality, designation of the medium size parameter indicating a size within the second size range and not within the first range in addition to the size within the first size range, the obtained quality parameter and the accepted medium size parameter being included in print settings used for generating print data.

2. The non-transitory storage medium according to claim 1,
    wherein the quality parameter is a parameter indicating resolution, and
    wherein, when executed by the computer, the plurality of instructions cause the information processing apparatus to obtain a first resolution as the first quality and a second resolution as the second quality lower than the first resolution as the quality parameter included in the print settings.

3. The non-transitory storage medium according to claim 1,
    wherein, when executed by the computer, the plurality of instructions cause the information processing apparatus to:
    determine, when the obtained quality parameter is the first quality, the first size range as a receivable size range of the medium size parameter, the first size range being a predetermined size range based on a data size of image data renderable by an operating system of the information processing apparatus when the quality parameter is the first quality; and
    determine, when the obtained quality parameter is the second quality, the second size range as a receivable size range of the medium size parameter, the second size range being a predetermined size range based on a data size of image data renderable by the operating system of the information processing apparatus when the quality parameter is the second quality.

4. The non-transitory storage medium according to claim 1,
    wherein a medium size of user definition is receivable as the medium size parameter, and
    wherein, when executed by the computer, the plurality of instructions cause the information processing apparatus to:
    receive, in a case where the receivable range of the medium size parameter is within the first size range an expansion instruction for expanding a receivable range of the medium size parameter as the medium size of user definition; and
    when the expansion instruction is received, set the quality parameter to the second quality, and change the receivable range of the medium size parameter as the medium size of user definition from the first size range to the second size range.

5. The non-transitory storage medium according to claim 4,
    wherein, when executed by the computer, the plurality of instructions cause the information processing apparatus to notify information indicating that the quality parameter is changed to the second quality when the expansion instruction is received.

6. The non-transitory storage medium according to claim 4,
    wherein, when executed by the computer, the plurality of instructions cause the information processing apparatus to:
    receive a return instruction for returning the receivable range of the medium size parameter to an original range after the receivable range of the medium size parameter as the medium size of user definition is changed;
    determine, when the return instruction is received, whether a size inputted as the medium size of user definition is within the first size range or not;
    when it is determined that the size inputted as the medium size of user definition is within the first size range, change the receivable range of the medium size parameter as the medium size of user definition from the second size range to the first size range; and
    when it is determined that the size inputted as the medium size of user definition is not within the first size range, notify information indicating that the medium size parameter is inappropriate.

7. The non-transitory storage medium according to claim 1,
wherein the medium size of user definition is receivable as the medium size parameter, and
wherein, when executed by the computer, the plurality of instructions cause the information processing apparatus to determine the receivable range of the medium size parameter as the medium size of user definition in accordance with the designated quality parameter.

8. The non-transitory storage medium according to claim 1,
wherein, when executed by the computer, the plurality of instructions cause the information processing apparatus to:
receive a quality change instruction for changing the quality parameter;
determine, when the quality change instruction is received, whether the designated medium size parameter is within a first threshold range indicating an allowable range of sizes in a quality parameter obtained after the change by the quality change instruction or not;
change the quality parameter to a quality parameter indicated by the quality change instruction when it is determined that the designated medium size parameter is within the first threshold range; and
notify information indicating that the designated medium size parameter is inappropriate when it is determined that the designated medium size parameter is not within the first threshold range.

9. The non-transitory storage medium according to claim 8,
wherein, when executed by the computer, the plurality of instructions cause the information processing apparatus to:
when it is determined that the designated medium size parameter is not within the first threshold range, change the designated medium size parameter to a size included in the first threshold range, and to change the quality parameter to a quality parameter indicated by the quality change instruction.

10. The non-transitory storage medium according to claim 1,
wherein, when executed by the computer, the plurality of instructions cause the information processing apparatus to:
receive a medium size change instruction for changing the medium size parameter;
determine, when the medium size change instruction is received, whether the medium size parameter indicated in the medium size change instruction is within a second threshold range indicating an allowable range of sizes in the designated quality parameter or not;
change the medium size parameter to a medium size parameter indicated by the medium size change instruction when it is determined that the medium size parameter indicated in the medium size change instruction is within the second threshold range; and
notify information indicating that the medium size parameter indicated in the medium size change instruction is inappropriate when it is determined that the medium size parameter indicated in the medium size change instruction is not within the second threshold range.

11. The non-transitory storage medium according to claim 10,
wherein, when executed by the computer, the plurality of instructions cause the information processing apparatus to:
when it is determined that the medium size parameter indicated in the medium size change instruction is not within the second threshold range, change the designated quality parameter to a quality parameter to which the medium size parameter indicated in the medium size change instruction is applicable, and to change the medium size parameter to the medium size parameter indicated in the medium size change instruction.

12. The non-transitory storage medium according to claim 1,
wherein, when executed by the computer, the plurality of instructions cause the information processing apparatus to:
in response to receipt an ability request of the quality parameter from an application program incorporated in the information processing apparatus through an operating system of the information processing apparatus, make the application program respond an acceptable quality parameter through the operating system, the ability request including information indicating the medium size parameter; and
make the application program respond an extracted quality parameter to which the medium size parameter indicated by the information included in the ability request is applicable.

13. An information processing apparatus comprising:
a controller,
wherein the controller is configured to:
obtain a quality parameter indicating print quality that includes at least a first quality and a second quality lower than the first quality;
determine, when the obtained quality parameter is the first quality, a first size range predetermined so as to correspond to the first quality as a size range indicating a receivable medium size parameter, and determine, when the obtained quality parameter is the second quality, a second size range predetermined so as to correspond to the second quality as a size range indicating a receivable medium size parameter, the second size range exceeding the first size range, the medium size parameter being a parameter indicating a size of a print medium; and
accept, when the obtained quality parameter is the first quality, designation of the medium size parameter indicating a size within the first size range, and accept, when the obtained quality parameter is the second quality, designation of the medium size parameter indicating a size within the second size range and not within the first range in addition to the size within the first size range, the obtained quality parameter and the accepted medium size parameter being included in print settings used for generating print data.

* * * * *